United States Patent
Ho

[19]

[11] Patent Number: 5,912,966
[45] Date of Patent: Jun. 15, 1999

[54] ENHANCED ECHO CANCELLER FOR DIGITAL CELLULAR APPLICATION

[75] Inventor: Dominic King-Choi Ho, Montreal, Canada

[73] Assignee: Northern Telecom Limited, Montreal, Canada

[21] Appl. No.: 08/933,383

[22] Filed: Sep. 19, 1997

Related U.S. Application Data

[63] Continuation of application No. 08/690,914, Aug. 1, 1996, abandoned.

[51] Int. Cl.$^6$ .................................................. H04M 1/00
[52] U.S. Cl. ............................ 379/410; 379/411; 379/3; 379/406; 370/289; 370/290; 370/291
[58] Field of Search ................................ 379/410, 411, 379/406, 389, 388, 3; 370/286, 290, 289, 476, 291; 455/570

[56] References Cited

U.S. PATENT DOCUMENTS

| | | |
|---|---|---|
| 4,468,641 | 8/1984 | Duttweiler et al. . |
| 4,584,411 | 4/1986 | Chance et al. . |
| 4,697,261 | 9/1987 | Wang et al. ............................ 370/32.1 |
| 4,712,235 | 12/1987 | Jones, Jr. . |
| 4,751,730 | 6/1988 | Galand et al. ............................ 379/410 |
| 5,062,102 | 10/1991 | Taguchi .................................. 379/410 |
| 5,084,865 | 1/1992 | Koike . |
| 5,131,032 | 7/1992 | Esaki et al. . |
| 5,193,112 | 3/1993 | Sano . |
| 5,237,562 | 8/1993 | Fuji et al. . |
| 5,263,019 | 11/1993 | Chu . |

(List continued on next page.)

FOREIGN PATENT DOCUMENTS

WO92/12583  7/1992  WIPO .............................. H04J 1/100

OTHER PUBLICATIONS

Seiichi Yamamoto et al., "An Adaptive Echo Canceller With Linear Predictor", Transactions of the Institute of Electronics and Communication Engineers of Japan, vol. E62, No. 12, Dec. 1979, pp. 851–857.

"LMS Coupled Adaptive Prediction and System Identification: A Statistical Model and Transient Mean Analysis", Mboup et al., IEEE Transaction on Signal Processing, vol., 42, No. 10, Oct. 1994.

"Echo Cancellation on time–Variant Circuits", Demytko et al., Proceedings of the IEEE, vol. 65, No. 3, Mar. 1977.

"Echo Cancelling Algorithms", Gritton et al., IEEE, ASSP Magazine, Apr. 1984.

"Signal–to–Noise and Idle Channel Performance of Differential Pulse Code ModulationSystems–Particular Applications to Voice Signals", McDonald, The Bell System Technical Journal, Sep. 1966.

"Numerically Stable Fast Transversal Filters for Recursive Least Square Adaptive Filtering", Slock et al., IEEE Transactions on Signal Processing, vol. 39, No . 1, Jan. 1991.

"An Adaptive Echo Canceller", The Bell System Technical Journal, M. M. Sondhi, Mar. 1997, pp. 497–511.

"Echo Cancellers", pp. 221–243, 1980.

Primary Examiner—Wellington Chin
Assistant Examiner—Keith Ferguson
Attorney, Agent, or Firm—Finnegan, Henderson, Farabow, Garrett & Dunner, L.L.P.

[57] ABSTRACT

An echo cancelling system for communication systems. The system includes an adaptive filter that processes the speech signal re-constructed by a voice decoder to generate an echo estimate. The echo estimate is subtracted from the echo containing signal propagating in the communication link to remove or at least reduce the echo corruption. The tap coefficients of the adaptive filter are established on the basis of an error signal that is representative of difference between the echo estimate and the actual echo and on the basis of a signal element that is a component of the re-constructed speech signal. The signal element is highly decorrelated to enable the adaptive filter to converge faster and manifest an improved echo return loss enhancement.

18 Claims, 5 Drawing Sheets

U.S. PATENT DOCUMENTS

| | | | |
|---|---|---|---|
| 5,263,020 | 11/1993 | Yatsuzuka et al. | 379/410 |
| 5,305,309 | 4/1994 | Chujo et al. . | |
| 5,307,405 | 4/1994 | Sih . | |
| 5,315,585 | 5/1994 | Iizuka et al. . | |
| 5,319,585 | 6/1994 | Amrany . | |
| 5,343,522 | 8/1994 | Yatrou et al. | 379/410 |
| 5,374,705 | 12/1994 | Laycock et al. . | |
| 5,475,731 | 12/1995 | Rasmusson . | |
| 5,479,502 | 12/1995 | Ohga et al. | 379/406 |
| 5,539,731 | 7/1996 | Haneda et al. | 379/410 |
| 5,592,548 | 1/1997 | Sih | 379/410 |
| 5,613,899 | 3/1997 | Duttweiler | 379/411 |

ENHANCED ECHO CANCELLER FOR DIGITAL CELLULAR APPLICATION

This application is a continuation of application Ser. No. 08/690,914, filed Aug. 1, 1996, now abandoned.

FIELD OF THE INVENTION

The present invention relates to a method and a system for inhibiting echo in a communication line. The system is particularly useful for communication systems that convey voice coded signals consisting of speech model parameters and excitation information. In a most preferred embodiment of the invention the excitation information is extracted from the re-constructed voice-coded signal and used to train an adaptive filter to effect echo inhibition. The excitation signal is frequency rich and allows to increase the convergence rate and the echo return loss enhancement of the adaptive filter.

BACKGROUND OF THE INVENTION

In a typical telephone network a hybrid converter is provided to connect the unidirectional four wire link from the public switched telephone network (PSTN) to the local two wire loop. The basic function of the hybrid converter is to separate the transmitted signal originating in the local loop from the received signal in the PSTN section, and vice versa. This process requires the energy of the received signal to pass fully in the local loop. However, due to an impedance mismatch in the hybrid converter, part of the received energy is reflected back to the transmitting port. As a result, a talker hears his own delayed speech which, of course, is undesirable. This kind of echo generated by interactions occurring in the communication network is called an electrical echo.

Another phenomenon that generates echo is from a hands-free telephone terminal. The speech signal generated from the speaker in the terminal will propagate in the form of an acoustic wave through an acoustic environment and part of it will be captured back by the microphone of the terminal. This residue signal will be transmitted back to the talker and creates echo. This kind of echo is referred to as acoustic echo.

To avoid echo problem suppressors are used in the communication networks. A typical echo suppressor is a switch that monitors the voice signals travelling in both directions. The suppressor detects which person is talking and blocks the signal travelling in the opposite direction. In essence, the echo suppressor transforms the communication link into an unidirectional path allowing only one person to speak at the time. The drawback of such echo suppressors is that they tend to "chop" speech signals when the subscribers talk back and forth quickly. This is because the suppressor is not able to switch direction fast enough. Moreover, during double talk, i.e., when the subscribers talk simultaneously, the suppressor fails to control the echo.

One possibility to avoid the problems of echo suppressors is to provide circuitry that instead of blocking speech signals in one direction in the communication link cancels the echo by using an adaptive filter. In essence, the echo canceller synthesizes the echo which is then subtracted from the composite signal (speech signal+echo signal). If the echo canceller models the true echo path well, the resultant signal is substantially free from any echo corruption.

To make the echo cancellation concept useful, the distinctive characteristics of the echo signal must be measured and stored in the echo canceller for operation. A direct measure beforehand is not practical because first of all, the echo is dependent on the circuit connections in the electrical echo case and on the acoustic environment in the acoustic echo case. This makes the measurement extremely difficult if not impossible. Secondly, the echo may be varying due to dynamic link connections or an unstable acoustic environment. As mentioned before one way to overcome this difficulty is to use an adaptive filter to gradually identify the characteristics of the echo in order to perform cancellation. Although an adaptive echo canceller can model the echo signal without requiring any prior knowledge of its characteristics, it has a finite learning time to reach a final solution. The convergence speed is a measure of how fast an adaptive filter reaches an acceptable error level. As a consequence, the echo will be present at the beginning of a call because at that moment the adaptive filter is beginning the learning process and the magnitude of the error signal is most likely not to be optimum yet. In addition, the user will hear a short period of electrical echo when the call is switched to a new link. In the case of an acoustic echo the echo characteristics are changing from time to time. Effective echo cancellation in these situations requires a fast convergence rate.

The convergence speed of a typical adaptive filter is such that effective echo cancellation will occur a few seconds after the learning process has been initiated. Therefore, at the beginning of a call there is a period of time during which the subscriber will hear at least some echo. This problem is particularly annoying in cellular telephony applications where the subscriber moves from one reception cell to the other. At the entry in a given reception cell the learning process of the echo canceller must be repeated which involves the short but objectionable period of echo presence.

The generation of a linear echo can be modelled as follows:

$$Y(k) = \sum_{i=0}^{N-1} h_i^\circ x(k-i) + \omega(k)$$

Where

Y(k) is the kth output sample of the echo signal are the parameters that characterize the echo path $\omega(k)$ is random noise or modelling error x(k) is the kth input sample of the source signal N−1 is the order of the model Echo cancellation can be effected by using an adaptive filter which estimates Y(k) by the filter output A(k) to nullify the speech signal that constitutes the echo. The output of the adaptive filter is expressed by the following equation:

$$A(k) = \sum_{i=0}^{N-1} h_i x(k-i)$$

The echo tends towards nullity when the error e(k)

$$e(k) = Y(k) - \sum_{i=0}^{N-1} h_i x(k-i) = \sum_{i=0}^{N-1} \left(h_i^\circ - h_i\right) x(k-i) + \omega(k)$$

between the two quantities is minimized:

The filter coefficients are adjusted to minimize the output mean-squared error (MSE) $E[e^2(k)]$:

$$E[e^2(k)] = E\left[\left(\sum_{i=0}^{N-1} \left(h_i^o - h_i\right)x(k-i)\right)^2\right] + E[\omega^2(k)]$$

After some learning period the adaptive filter will converge to $h_i = h_i$ $0 \leq i \leq N-1$ In order to reach the solution, one has to find a procedure to guide the adaptive filter to reach the minimum error. This is referred as adaptive algorithm. There are two well known adaptation algorithms: the least-mean-square and the recursive least squares. The former is popular for its simplicity of implementation, while the latter has a much faster learning speed. These algorithms are well known in the digital telephony art and there is no need to describe them in detail.

The least-mean-square algorithm converges fastest when the input is white. One can therefore enhance the convergence speed by pre-whitening the input to the echo canceller. This is accomplished by placing a whitening filter before the canceller. However, a fixed whitening filter can improve convergence speed only in the statistical sense. That is, it enhances the speed when the input matches the correlation function used in designing the filter. A mismatch, on the other hand, will slowdown the convergence rate. A better approach is to make the whitening filter changeable by using a certain adaptive algorithm. Such an adaptive whitening filter, however, is ineffective, difficult and expensive to implement and for that reason it does not represent an optimal solution.

OBJECTIVES AND SUMMARY OF THE INVENTION

In view of the foregoing problems encountered in the known prior art, it is an object of the present invention is to provide an improved echo canceller system that is capable of quick adaptation to the particular echo path during a given call.

Another object of the invention is an improved method for effecting echo cancellation that allows to reduce the error between the echo estimate and the true echo more rapidly by comparison to prior art methods.

Another object of the invention is to provide a communication system using the aforementioned echo canceller.

A further object of the invention is to provide a method for reducing the convergence rate of an echo canceller system.

Yet, another object of the invention is to provide a novel adaptive filtering system having a high convergence rate, particularly well suited for use in echo cancellation systems.

It should be noted that for the purposes of this specification the expression "echo canceller" should be interpreted in a broad sense to designate systems that substantially eliminate the echo or at least partially reduce the echo magnitude. Thus, "echo canceller" is not intended to exclusively designate a system that totally eliminates the echo.

As embodied and broadly described herein the invention provides an echo canceller for reducing a magnitude of an echo occurring in a return channel of a communication system, said echo canceller including:

first means for generating an echo estimate, said first means including a first input for receiving a first signal that is a precursor of the echo in the return channel of the communication system and a second input for receiving a second signal related to said first signal and being more decorrelated than said first signal; and second means in operative relationship with said first means, said second means being responsive to said echo estimate for conditioning a signal propagating on the return channel of the communication system to inhibit echo therein.

The present inventor has made the unexpected discovery that the echo canceller can be caused to converge faster by utilizing in the adaptation process a component of the source signal (the signal from which the echo estimate is generated) that is more decorrelated than the source signal. This additional signal element allows to reduce the learning period of the echo canceller very significantly.

In a most preferred embodiment of the invention the echo canceller includes an adaptive filter provided with a decorrelation unit whose function is to whiten the re-constructed speech input generated by the voice decoder. The decorrelated data along with the error signal e(k) are used to change the adaptive filter characteristics in order to keep the error signal at minimum. The decorrelation filter employs the same parameters used by the low bit-rate speech decoder so no additional processing is required to tune the decorrelation filter. Typically, the information extracted by the decorrelation filter is closely related to excitation signal contained in each frame of the coded speech signal. One characteristic of the excitation signal is that it is highly decorrelated. The decorrelated nature of the excitation signal allows the adaptive filter to converge faster toward the minimum error by comparison to prior art systems where the input of the adaptive filter is only a correlated speech signal.

For the purposes of the present specification the expression "decorrelated" and "correlated" will be defined with relation to one another. A "decorrelated" signal will designate a signal that is characterized by a more uniform energy distribution across the frequency range of interest than a "correlated" signal. Thus, for a given frequency range divided in a predetermined number of bands the energy content of a decorrelated signal will typically be distributed more uniformly in the frequency range and among a larger number of bands than in the case of a correlated signal. The correlated nature of a given signal can also be expressed in terms of spectral density or spectral energy distribution which is defined as the power carried by the signal within some interval of frequency. A correlated signal will exhibit a substantially less uniform spectral density over the same frequency range than a decorrelated signal. As an example, a totally random or unpredictable signal in the time domain produces a perfectly decorrelated signal that has a frequency spectrum which is flat across the frequency range of interest. On the other hand, a speech waveform exhibits a much higher level of correlation.

The definition above as to what constitutes a correlated signal and a decorrelated signal applies to long-term measurements or observations, not to short term occurrences. Indeed, a totally random signal may over a short period of time appear highly correlated (the energy is concentrated in a narrow frequency band) while over a longer term period the signal is decorrelated because the energy load "walks" across the entire frequency range of interest. In contrast, in a correlated signal most of the energy will systematically be found to occur in a narrow frequency band within the frequency range. For example, in speech coding applications "long term" could refer to a period of time in the order of 20–40 milliseconds.

In a preferred embodiment of the invention summarized above, the decorrelation filter is updated at the same time as the voice decoder which, typically occurs at each frame of the coded speech signal. The updating procedure of the decorrelation filter simply consist of copying the coefficient of the voice decoder.

In a most preferred embodiment the echo canceller uses a novel least-mean-square type algorithm to update the parameters of the adaptive filter in order to maintain the error signal low. This algorithm uses the three following inputs:

A) The error signal e(k);

B) A power estimate signal that is the exponential running average of the output of the decorrelation filter;

C) A number of sub parameters established on the basis of the output of the decorrelated signal.

The adaptive algorithm processes those signals to calculate a set of coefficients that are communicated to the adaptive filter of the echo canceller.

As embodied and broadly described herein the invention further provides a communication system including:

voice decoder for receiving coefficients data and excitation information to re-construct a speech signal;

a return channel in which an echo is susceptible to occur;

an echo canceller for reducing a magnitude of the echo in said return channel, said echo canceller comprising;
  a) first means for generating an estimate of the echo in said return channel, including
   I) a first input in operative relationship with said voice decoder for receiving said re-constructed speech signal;
   II) a second input for receiving a component of said re-constructed speech signal, said component being more decorrelated than said re-constructed speech signal;
   III) a third input for receiving an error signal which is representative of a divergence between said echo estimate a real echo propagating on said return channel;
   IV) means for processing the signals at said first, second and third inputs and for outputting an echo estimate signal;
  b) second means in operative relationship with said first means, said second means being responsive to said echo estimate for conditioning a signal propagating on said return channel to inhibit echo therein;
  c) a divergence detector means for calculating said error signal between said echo estimate and an actual echo propagating on said return channel of the communication system, said divergence detector being operatively associated with said third input to supply thereto said error signal.

As embodied and broadly described herein the invention also provides a combination that includes:

a voice decoder for generating a re-constructed speech signal;

means for generating an estimate of an echo of said re-constructed speech signal, comprising:
  an adaptive filter in operative relationship with said voice decoder to condition said re-constructed speech signal and in turn generate said estimate of an echo, said adaptive filter having a transfer function determined by a plurality of coefficients:
  processing means including:
   a) a first input for receiving a signal derivable from said re-constructed speech signal and being more decorrelated than said re-constructed speech signal;
   b) a second input for receiving a error signal indicative of a difference between said estimate of an echo and a desired output, wherein said processing means determines at least partially from the signal at said first input and said error signal said plurality of coefficients.

As embodied and broadly described herein the invention yet provides a method of increasing a convergence rate of an echo canceller that reduces the magnitude of an echo occurring in a return channel of a communication system, said echo canceller including:

first means for generating an echo estimate, said first means including an input for receiving a first signal that is a precursor of the echo in the return channel of the communication system;

second means in operative relationship with said first means, said second means being responsive to said echo estimate for conditioning a signal propagating on the return channel of the communication system to inhibit echo therein, said method comprising the steps of:

providing to said first means a second signal derivable from said first signal, said second signal being more decorrelated than said first signal, said first and second signals influencing said first means in the generation of said echo estimate, the presence of said second signal allowing said echo canceller to converge at a higher rate.

As embodied and broadly described herein the invention also provides a method for reducing a magnitude of an echo occurring in a return channel of a communication system, said method including the steps of:

a) generating an echo estimate, comprising the steps of:
  providing a first signal that is a precursor of the echo in the return channel of the communication system;
  processing said first signal to obtain therefrom a second signal that is more decorrelated than said first signal;
  providing an error signal that is representative of a divergence between said echo estimate and an actual echo propagating on the return channel of the communication system;
  processing said first, second and third signals to produce said echo estimate;

b) subtracting from a signal propagating through said return channel said echo estimate.

As embodied and broadly described herein the invention also provides an adaptive filtering system having a high convergence rate, said adaptive filtering system comprising:

a filtering stage including a predetermined number of tap coefficients that determine the transfer function of the filter, said filtering stage including an input for receiving a first signal to be conditioned by said filtering stage;

a processing stage to compute said tap coefficients, said processing stage including:

an input for receiving a second signal that is a component of said first signal, said second signal being more decorrelated than said first signal; and an input for receiving an error signal representative of a difference between an actual output of said filtering stage and a desired output, whereby said processing stage determines at least partially on the basis of said second signal and said error signal said tap coefficients.

DESCRIPTION OF A PREFERRED EMBODIMENT

The present invention provides an improved echo canceller system that is particularly well suited for use in communications networks where an echo is susceptible to occur either due to electrical interactions inside the communication link (electrical echo) or as a result of an acoustic feedback taking place at one end of the communication link (acoustical echo). For simplicity the example of the invention described below will be made with reference to a cellular telephone network where echo occurs as a result of an impedance mismatch. It should be understood, however, that the scope of the invention should not be limited to this specific communication network environment nor to the particular type of echo encountered (electrical echo).

Figure 1:
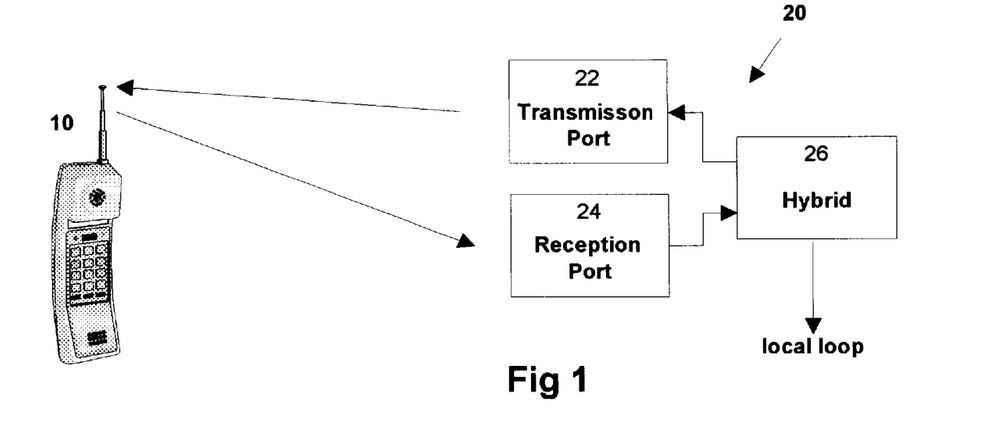
FIG. 1 is a block diagram of communication link utilizing a hybrid between a four wire section and a two wire section of the link.

A typical wireless communication network is depicted by the block diagram in FIG. 1. The network includes a wireless telephone 10 that can exchange coded speech signals with a land based station 20. The station includes a transmission channel 22 and a reception channel 24 connected to a hybrid 26 that constitutes an interface between the four wire reception/transmission channels section and the two wire local loop.

Figure 2:
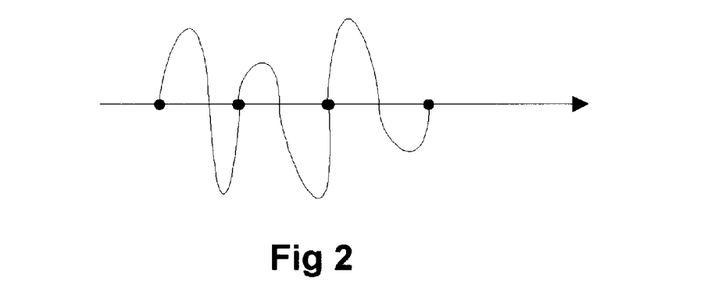
FIG. 2 is a diagram of a typical speech waveform.

During a typical call the speech waveform of the type shown in the graph at FIG. 2, is digitized and the consecutive bytes are grouped in successive frames that are coded and transmitted individually to the reception port 24. For the purpose of the example let's consider a single frame of the digitized speech waveform. The digitized data is processed by a voice coder shown in FIG. 3 that is located in the telephone 10, which extracts perceptually significant features of speech from the time waveform. In essence, the voice coder 28 analyzes the waveform to produce a time-varying model of the vocal tract excitation and transfer function. During a given frame, however, the vocal tract is assumed to represent a linear time-invariant process.

Figure 3:
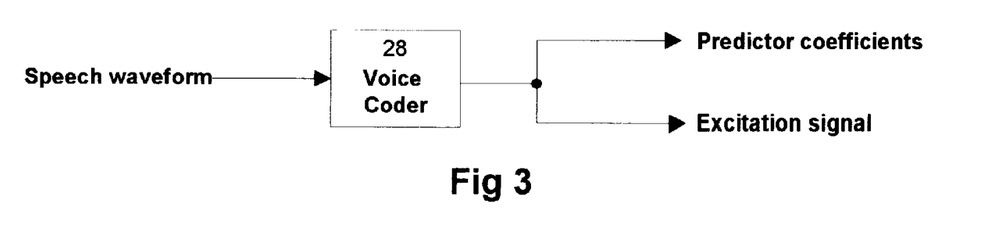
FIG. 3 is a block diagram of a voice coder circuit.

Thus, for each frame of the speech waveform the voice coder 28 generates an excitation signal and a set of predictor coefficients that characterize the transfer function of the model. The excitation signal and the set of predictor coefficients are modulated and transmitted towards the reception channel 24. The same process is repeated for each frame of the speech waveform.

Figure 4:
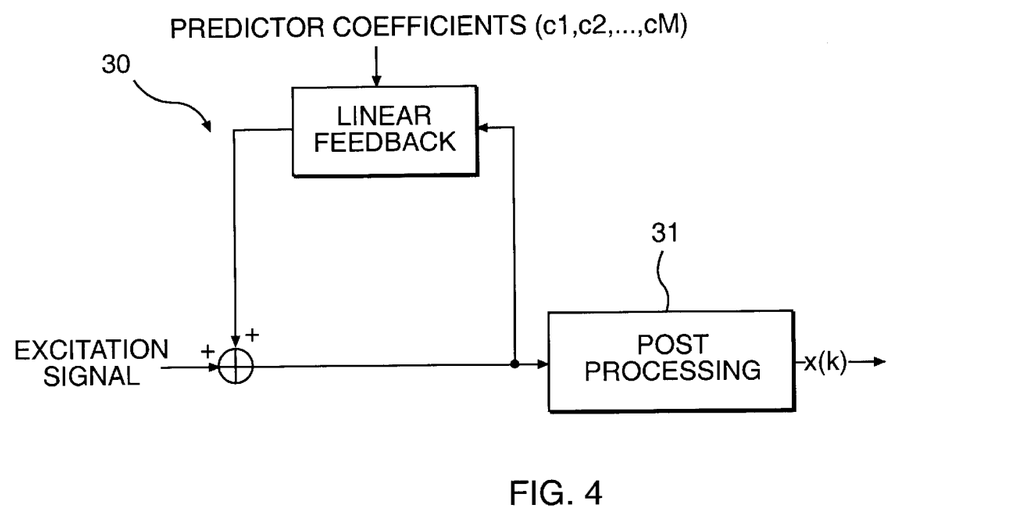
FIG. 4 is a block diagram of a voice decoder for speech regeneration.

At the reception channel 24 the coded signal is demodulated and the digitized speech waveform re-constructed by using a decoder 30 whose transfer function is illustrated in FIG. 4. In essence, the decoder 30 generates the current speech sample by a linear combination of previous speech samples and the excitation. Post processing, illustrated by the block 31 is then applied to improve speech quality. The output signal x(k) of the decoder 30 which is the reconstructed digitized waveform is expressed by the following equation:

$$x(k) = \sum_{i=1}^{M} c_i x(k-i) + n(k)$$

Where x(k) is the kth output sample;

n(k) is the excitation signal;

$C_1, C_2, \ldots C_M$ are the predictor coefficients for the given frame;

M is the order of the model. Typically, M has a value of 10.

It should be noted that n(k) is not exactly the same as the excitation signal received by the voice decoder that re-constructs the speech waveform. The difference is due primarily to the presence of the post-processing stage 31 that eliminates some components of the re-constructed speech signal. To distinguish these two quantities n(k) will be referred to in the following description as re-constructed excitation.

In theory all the energy of the reconstructed speech signal x(k) should be transmitted entirely to the local loop through the hybrid. However, the hybrid will reflect a small fraction of the incoming signal energy due to impedance mismatch problems. As a result, the reflected signal is returned to the source as an echo through the transmitter port. The subjective effects of the echo to the human ear depends primarily upon the round-trip delay (echo with respect to original signal). When the delay exceeds approximately 40 milliseconds the echo signals become clearly perceptible and annoying during a conversation. This threshold is exceeded in most telecommunications systems which necessitates the use of an echo canceller.

Figure 5:
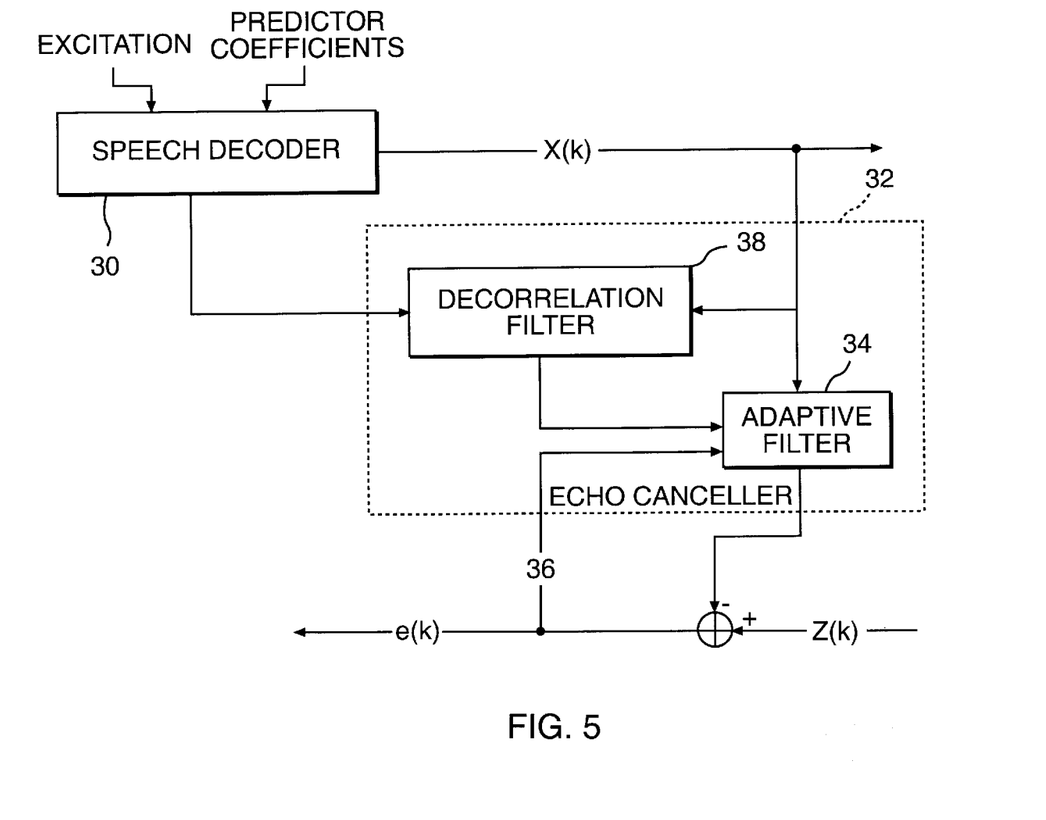
FIG. 5 is a block diagram of an echo canceller circuit showing the relationship with the voice decoder depicted in FIG. 4.

The improved echo canceller 32 constructed in accordance with the present invention is depicted in FIG. 5. The echo canceller 32 is connected to the speech decoder 30 and receives the reconstructed speech signal x(k). On the basis of this input the echo canceller 32 synthesizes an echo signal that is added with the composite signal Z(k) that is constituted by the speech signal originating from the local loop and the echo. In the situation where the subscriber at the local loop is not talking then Z(k) is only the echo signal. If the echo canceller models the true echo path with accuracy, the resultant signal is echo free.

The echo canceller includes an adaptive filter that alters the input signal x(k) to bring it as close as possible to the echo. A feedback loop 36 is provided allowing the filter 34 to alter its transfer function and converge to nullify or at least reduce the error signal e(k). A novel aspect of the present invention resides in the provision of a decorrelation filter 38 that supplies a frequency rich input to the adaptive filter 34 which enables that filter to converge faster. The decorrelation filter 38 uses the predictor coefficients from the speech decoder 30 to process the speech signal x(k) to extract therefrom the excitation information n(k). The excitation signal n(k) is much more decorrelated than the reconstructed speech signal and this allows the adaptive filter 34 to reach a small error condition much faster.

Figure 6:
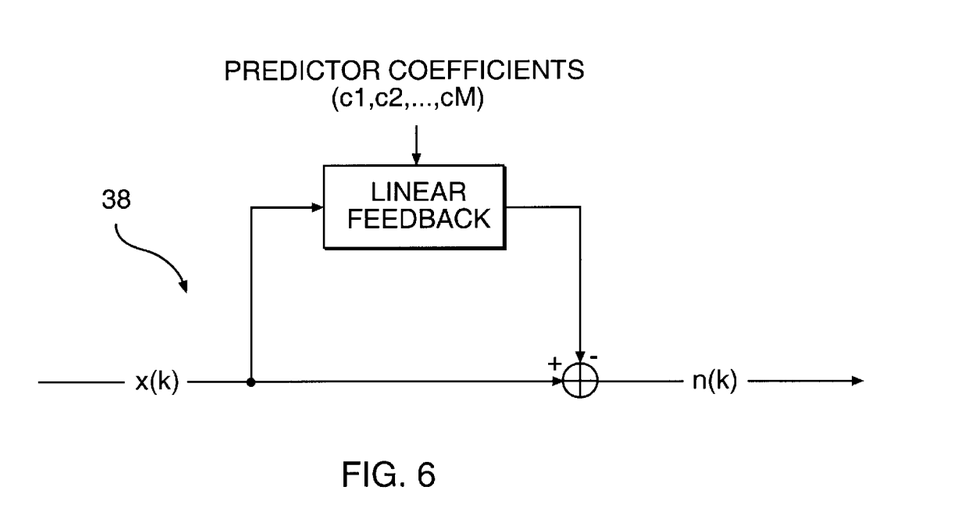
FIG. 6 is a block diagram for re-generating excitation from the decoded speech signal for use in the adaptive filter of the echo canceller.

The block diagram of the decorrelation filter 38 is shown at FIG. 6. It will be noted that the decorrelation filter is set as the inverse of the speech decoder. The output of the decorrelation filter is expressed by the following equation:

$$n(k) = x(k) - \sum_{i=1}^{M} c_i x(k-i)$$

Where $C_1, C_2, \ldots C_M$ are the predictor coefficients for the given frame

The predictor coefficients are updated at the same time as those of the speech decoder. Since the speech decoder 30 is constant within a frame, the decorrelation filter 38 needs to be modified only after each frame and then it is kept unchanged. The updating procedure of the decorrelation filter 38 is effected simply by copying the predictor coefficients from the speech decoder 30 by any convenient means.

Typically, the order of the decorrelation filter 38 would be 10 (order of the filter or value M) which is typical of most commercially available speech decoders.

Figure 7:
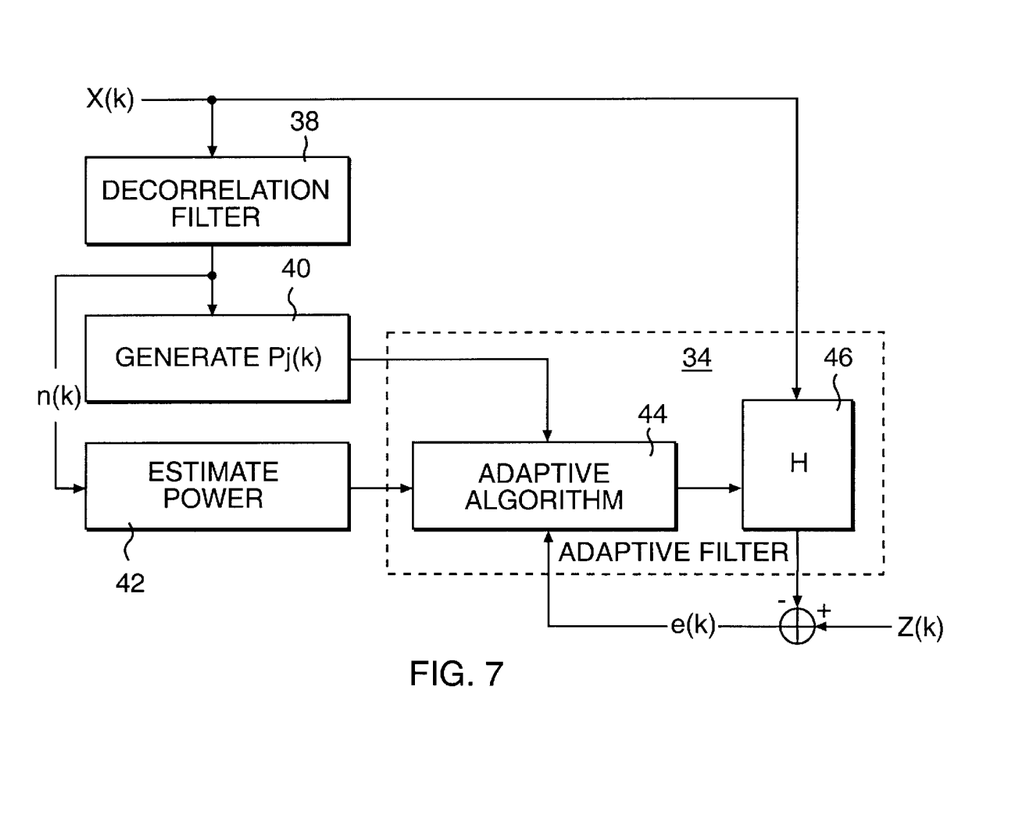
FIG. 7 is more detailed block diagram of the echo canceller circuit.

FIG. 7 is a more detailed block diagram of the echo canceller 32. In addition to the decorrelation filter block 38 and the adaptive filter 34 shown in FIG. 5 the more complete diagram of FIG. 7 also indicates that the echo canceller includes two additional function blocks namely a generator of coefficients 40 and a power estimator 42 that process individually the re-constructed excitation signal n(k) to supply additional parameters to a novel adaptive algorithm that calculates the coefficients of the adaptive filter. Note that for the purpose of simplicity, the adaptive filter 34 has been shown at FIG. 7 as two separate blocks namely the adaptive algorithm 44 and the filter core 46 which effect the actual signal processing.

In the most preferred embodiment of the present invention the following modified least mean square algorithm has been implemented:

$$h_0(k+1) = h_0(k) + \mu \frac{e(k)}{\hat{\sigma}_n^2(k)} p_0(k)$$

$$h_1(k+1) = h_1(k) + \mu \frac{e(k)}{\hat{\sigma}_n^2(k)} p_1(k)$$

$$\ldots$$

$$h_N(k+1) = h_{(N-1)}(k) + \mu \frac{e(k)}{\hat{\sigma}_n^2(k)} p_{N-1}(k)$$

Where
- $h_i$ is the ith coefficient of the filter core 46;
- $e(k)$ is the error signal;
- $p_i(k)$ is a ith coefficient (see below);
- $\mu$ is a positive constant; and
- $\hat{\sigma}_n^2(k)$ is the power estimate of the re-constructed excitation signal n(k)

Figure 8:
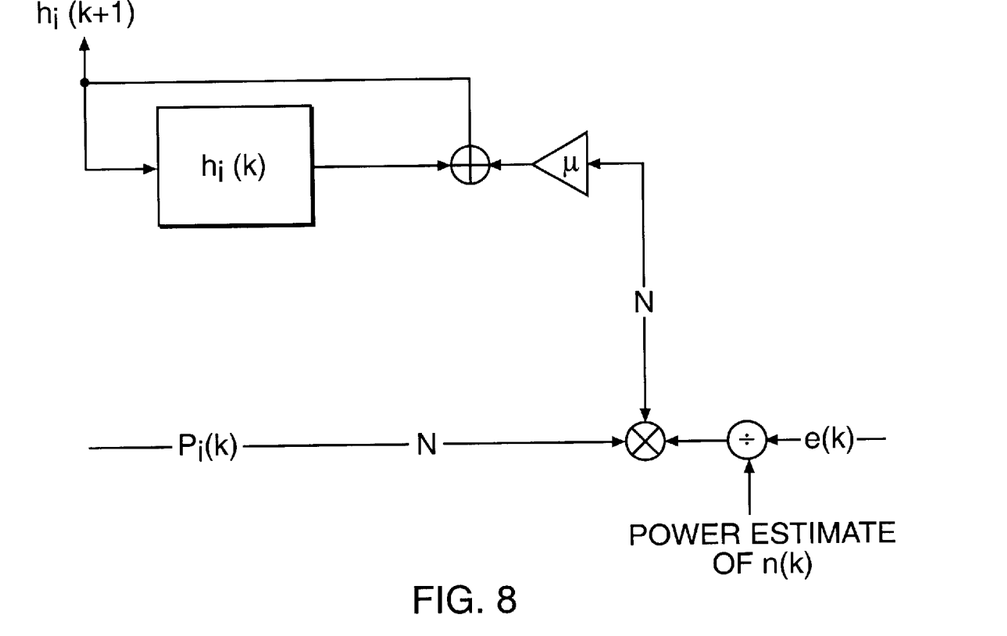
FIG. 8 is a block diagram illustrating the transfer function of the algorithm operating the adaptive filter of the echo canceller depicted in FIG. 7.

The block diagram of the circuit for calculating the coefficients of the filter core 46 is shown in FIG. 8. The error e(k) is divided by the power estimate and multiplied by the coefficient $p_i(k)$ The resultant N values are scaled by a positive constant $\mu$ and added to the coefficients for adaptation. Once the parameters have been established they are transferred to the filter core 46. Preferably the positive constant $\mu$ should be less than ⅓ N and most preferably it should be set to a value in the range ¼ N to ⅕ N.

Figure 9:
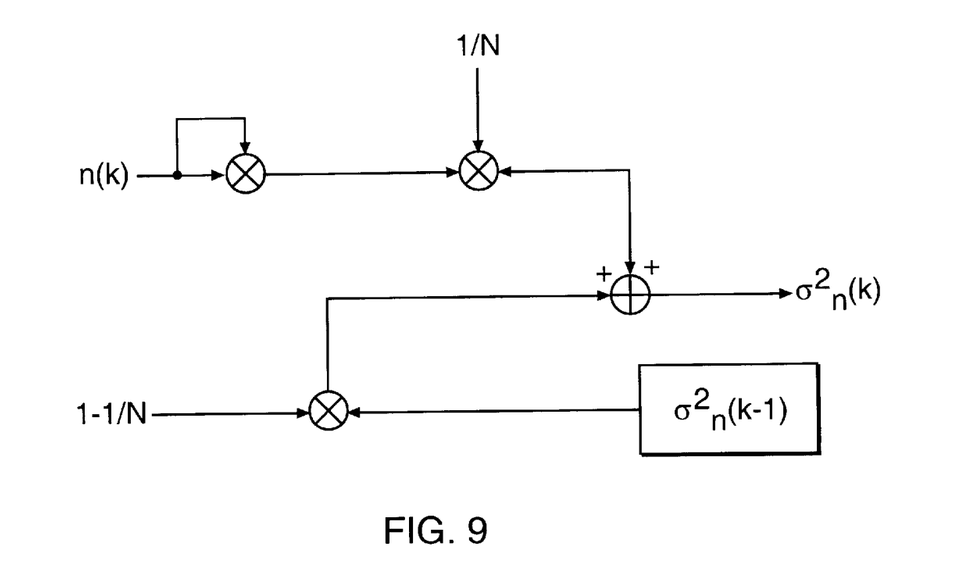
FIG. 9 is a block diagram illustrating the transfer function of the power estimator block shown in the diagram at FIG. 7.

The power estimate is the exponential running average of $n^2(k)$. It can be established by using the following equation. The transfer function is graphically illustrated by the block diagram in FIG. 9.

$$\hat{\sigma}_n^2(k) = \left(1 - \frac{1}{N}\right)\hat{\sigma}_n^2(k-1) + \frac{1}{N}n^2(k)$$

Figure 10:
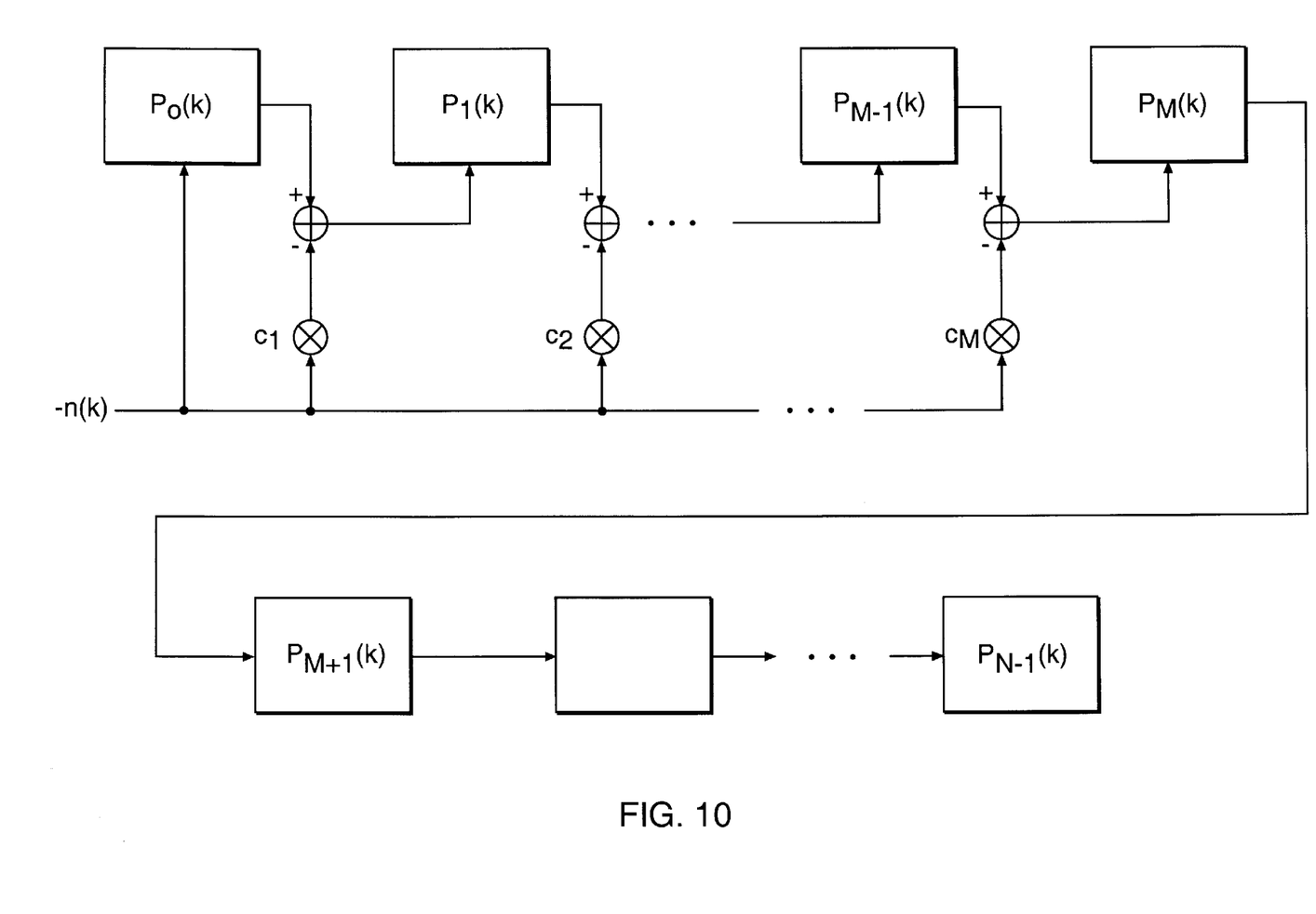
FIG. 10 is block diagram illustrating the transfer function of the block generating the coefficients $p_j(k)$ shown in FIG. 7.

Finally, the coefficients $p_i(k)$ are generated from the excitation signal as follows:

$p_0(k)=n(k)$ $p_i(k)=p_{(i-1)}(k-1)-c_i(k)n(k)$  $1 \leq i \leq M$ $p_i(k)=p_{(i-1)}(k-1)$  $M+1 \leq i \leq N-1$ Where:
- $c_i$ is the ith coefficient transferred from the voice decoder;
- N−1 is the order of the echo canceller;
- M is the order of the voice decoder The block diagram for generating the coefficients is shown in FIG. 10.

Typically, N has a value in the range from 300 to 2000. In the most preferred embodiment of the invention N has a value of 384.

The above description of the invention should not be interpreted in any limiting manner since variations and refinements of the preferred embodiment are possible without departing from the spirit of the invention. The scope of the invention is defined in the appended claims and their equivalents.

I claim:

1. An adaptive echo canceller for reducing a magnitude of an echo occurring in a return channel of a communication system, the communication system including a forward channel through which propagates a first signal that is a precursor of the echo in the return channel of the communication system, the first signal being a re-constructed speech signals, said echo canceller including:
   first means for generating an echo estimate, said first means including:
   a) a first input for receiving the first signal that is a precursor of the echo in the return channel of the communication system;
   b) a second input for receiving a set of first coefficients of a voice decoder capable of generating the first signal;
   c) first processing means for processing the first set of coefficients and the first signal to generate an excitation signal that is more decorrelated than the first signal;
   d) second processing means for processing the first set of coefficients and the excitation signal to generate a second set of coefficients;
   e) an adaptive filter receiving the second set of coefficients for processing the first signal in accordance with a transfer function determined at least in part by the second set of coefficients to generate the echo estimate;
   second means in operative relationship with said first means, said second means being responsive to the echo estimate for conditioning a signal propagating on the return channel of the communication system to inhibit echo therein.

2. An echo canceller as defined in claim 1, including a divergence detector means for calculating an error signal between said echo estimate and an actual echo propagating on the return channel of the communication system, said second processing means including an input for receiving the error signal.

3. An echo canceller as defined in claim 2, wherein said second processing means calculates a power estimate of the excitation signal and utilizes the power estimate in the computation of the second set of coefficients.

4. An echo canceller as defined in claim 3, wherein said second means includes a substractor that subtracts the echo estimate from a signal propagating in the return channel.

5. An echo canceller as defined in claim 4, wherein said second set of coefficients are computed by the following equations:

$$h_0(k+1) = h_0(k) + \mu \frac{e(k)}{\hat{\sigma}^2(k)} p_0(k)$$

$$h_1(k+1) = h_1(k) + \mu \frac{e(k)}{\hat{\sigma}^2(k)} p_1(k)$$

$$\ldots$$

$$h_N(k+1) = h_{(N-1)}(k) + \mu \frac{e(k)}{\hat{\sigma}^2(k)} p_{N-1}(k)$$

Where
   $h_i$ is the ith coefficient of the second set of coefficients that includes N coefficients;
   $e(k)$ is the error signal;
   $p_i(k)$ is an ith coefficient of a third set of coefficients that are correlated to the first set of coefficients;
   $\mu$ is a positive constant; and
   $\sigma_n^2(k)$ is a power estimate of the excitation signal.

6. An echo canceller as defined in claim 5, wherein the value
$$\sigma_n^2(k)$$
is computed by using the following equation:

$$\hat{\sigma}_n^2(k) = \left(1 - \frac{1}{N}\right)\hat{\sigma}_n^2(k-1) + \frac{1}{N}n^2(k)$$

Where $n(k)$ is the excitation signal.

7. An echo canceller as defined in claim 6, wherein the coefficients $p_i(k)$ are computed as follows:

$p_0(k) = n(k)$ $p_i(k) = p_{(i-1)}(k-1) - c_i(k)n(k)$  $1 \leq i \leq M$ $p_i(k) = p_{(i-1)}(k-1)$  $M+1 \leq i \leq N-1$ Where
   $c_i$ is the ith coefficient of the first set of coefficients;
   M is the number of coefficients in the first set of coefficients.

8. An echo canceller as defined in claim 7, wherein $\mu$ has a value in the range from ¼ N to ⅕ N.

9. An echo canceller as defined in claim 8, wherein N has a value in the range from 300 to 2000.

10. A method for reducing a magnitude of an echo occurring in a return channel of a communication system, the communication system including a forward channel through which propagates a first signal that is a precursor of the echo in the return channel of the communication system, the first signal being a re-constructed speech signal, said method comprising the steps of:
   providing a first set of coefficients of a voice decoder capable of generating the first signal;
   processing the first set of coefficients and the first signal to generate an excitation signal that is more decorrelated than the first signal;
   processing the first set of coefficients and the excitation signal to generate a second set of coefficients;
   supplying the second set of coefficients to an adaptive filter having a transfer function determined at lest in part by the second set of coefficients;
   processing the first signal by said adaptive filter to generate the echo estimate;
   utilizing said echo estimate to inhibit echo propagating in the return channel of the communication system.

11. A method as defined in claim 10, comprising the step of calculating an error signal between said echo estimate and an actual echo propagating on the return channel of the communication system, and utilizing said error signal to generate said second set of coefficients.

12. A method as defined in claim 11, comprising the step of computing a power estimate of the excitation signal and utilizing said power estimate in the computation of the second set of coefficients.

13. A method as defined in claim 12, comprising the step of subtracting said echo estimate from a signal propagating in the return channel.

14. A method as defined in claim 11, comprising the step of computing said second set of coefficients by the following equations:

$$h_0(k+1) = h_0(k) + \mu \frac{e(k)}{\hat{\sigma}^2(k)} p_0(k)$$

$$h_1(k+1) = h_1(k) + \mu \frac{e(k)}{\hat{\sigma}^2(k)} p_1(k)$$

$$\ldots$$

$$h_N(k+1) = h_{(N-1)}(k) + \mu \frac{e(k)}{\hat{\sigma}^2(k)} p_{N-1}(k)$$

Where
   $h_i$ is the ith coefficient of the second set of coefficients that includes N coefficients;
   $e(k)$ is the error signal;
   $p_i(k)$ is an ith coefficient of a third set of coefficients that are correlated to the first set of coefficients;
   $\mu$ is a positive constant; and
   $\sigma_n^2(k)$ is a power estimate of the excitation signal.

15. A method as defined in claim 14, wherein the value
$$\sigma_n^2(k)$$
is computed by using the following equation:

$$\hat{\sigma}_n^2(k) = \left(1 - \frac{1}{N}\right)\hat{\sigma}_n^2(k-1) + \frac{1}{N}n^2(k)$$

Where $n(k)$ is the excitation signal.

16. A method as defined in claim 15, wherein the coefficients $p_i(k)$ are computed as follows:

$p_0(k) = n(k)$ $p_i(k) = p_{(i-1)}(k-1) - c_i(k)n(k)$  $1 \leq i \leq M$ $p_i(k) = p_{(i-1)}(k-1)$  $M+1 \leq i \leq N-1$ Where
   $c_i$ is the ith coefficient of the first coefficients;
   M is the number of coefficients in the first set of coefficients.

17. A method as defined in claim 16, wherein $\mu$ has a value in the range from ¼ N to ⅕ N.

18. A method as defined in claim 17, wherein N has a value in the range from 300 to 2000.

* * * * *

UNITED STATES PATENT AND TRADEMARK OFFICE
CERTIFICATE OF CORRECTION

PATENT NO. : 5,912,966
DATED : June 15, 1999
INVENTORS : Kevin D. Hawkinson

It is certified that error appears in the above-identified patent and that said Letters Patent is hereby corrected as shown below:

Col. 9, line 49 change "$h_n(k+1)$" to -- $h_{(n-1)}(k+1)$ --.

Claim 5, second equation, change "$\sigma^2(k)$" to -- $\sigma^2_n(k)$ --.

Claim 5, third equation, change "$h_n(k+1)$" to -- $h_{(n-1)}(k+1)$ --.

Claim 14, second equation, change "$\sigma^2(k)$" to -- $\sigma^2_n(k)$ --.

Claim 14, third equation, change "$h_n(k+1)$" to -- $h_{(n-1)}(k+1)$ --.

UNITED STATES PATENT AND TRADEMARK OFFICE
CERTIFICATE OF CORRECTION

PATENT NO. : 5,912,966
DATED : June 15, 1999
INVENTORS : Kevin D. Hawkinson

It is certified that error appears in the above-identified patent and that said Letters Patent is hereby corrected as shown below:

In claim 1, col. 10, line 39, "signals" should read --signal--..
In claim 10, col. 12, line 2, "lest" should read --least--.

Signed and Sealed this

Ninth Day of May, 2000

Attest:

Q. TODD DICKINSON

*Attesting Officer*                    *Director of Patents and Trademarks*

UNITED STATES PATENT AND TRADEMARK OFFICE
CERTIFICATE OF CORRECTION

PATENT NO.    : 5,912,966
DATED         : June 15, 1999
INVENTOR(S)   : Kevin D. Hawkinson It is certified that error appears in the above-identified patent and that said Letters Patent is hereby corrected as shown below:

Column 9,
Line 49, change "$h_n(k+1)$" to -- $h_{(n-1)}(k+1)$ --.

Line 57, plerase change " $\delta_n^2(k)$ " to read -- $\hat{\sigma}^2_n(k)$ --

Column 10,
Line 39, "signals" should read -- signal --.

Column 11,
Line 6, "substractor" should read -- subtractor --.

Lines 11-12, first equation change " $\hat{\sigma}^2(k)$ " to read -- $\hat{\sigma}^2_n(k)$ --

Lines 14-16, change "$\sigma^2(k)$" to -- $\sigma^2_n(k)$ --.

Lines 18-19, third equation, change " $\hat{\sigma}^2(k)$ " to read -- $\hat{\sigma}^2_n(k)$ --

Lines 19-20, third equation, change "$h_n(k+1)$" to -- $h_{(n-1)}(k+1)$ --.

Lines 29 and 32, change "$\sigma_n^2(k)$" to - $\hat{\sigma}^2_n(k)$ ---

Column 12,
Line 12, "lest" should read -- least --.

Lines 23-24, first equation " $\hat{\sigma}^2(k)$ " should read -- $\hat{\sigma}^2_n(k)$ --

Lines 26-27, second equation " $\hat{\sigma}^2(k)$ " should read -- $\hat{\sigma}^2_n(k)$ --

Lines 27-28, second equation change "$\sigma^2(k)$" to -- $\sigma^2_n(k)$ --.
Lines 30-31, third equation, change "$h_n(k+1)$" to -- $h_{(n-1)}(k+1)$ --.

Lines 30-31, third equation change " $\hat{\sigma}^2(k)$ " to -- $\hat{\sigma}^2_n(k)$ --

UNITED STATES PATENT AND TRADEMARK OFFICE
CERTIFICATE OF CORRECTION

PATENT NO.   : 5,912,966
DATED        : June 15, 1999
INVENTOR(S)  : Kevin D. Hawkinson

It is certified that error appears in the above-identified patent and that said Letters Patent is hereby corrected as shown below:

Column 12, cont'd.,
Line 41, change "$\sigma_n^2(k)$" to -- $\hat{\sigma}_n^2(k)$ ---

Line 43, change "$\sigma_n^2(k)$" to -- $\hat{\sigma}_n^2(k)$ ---

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 5,912,966
DATED          : June 15, 1999
INVENTOR(S)    : Dominic King-Choi Ho It is certified that error appears in the above-identified patent and that said Letters Patent is hereby corrected as shown below:

Column 9,
Line 49, change "$h_n(k+1)$" to -- $h_{(n-1)}(k+1)$ --.

Line 57, plerase change " $\delta_n^2(k)$ " to read -- $\hat{\sigma}^2_n(k)$ --

Column 10,
Line 39, "signals" should read -- signal --.

Column 11,
Line 6, "substractor" should read -- subtractor --.

Lines 11-12, first equation change " $\hat{\sigma}^2(k)$ " to read -- $\hat{\sigma}^2_n(k)$ --

Lines 14-16, change "$\sigma^2(k)$" to -- $\sigma^2_n(k)$ --.

Lines 18-19, third equation, change " $\hat{\sigma}^2(k)$ " to read -- $\hat{\sigma}^2_n(k)$ --

Lines 19-20, third equation, change "$h_n(k+1)$" to -- $h_{(n-1)}(k+1)$ --.

Lines 29 and 32, change "$\sigma_n^2(k)$" to - $\hat{\sigma}^2_n(k)$ ---

Column 12,
Line 12, "lest" should read -- least --.

Lines 23-24, first equation " $\hat{\sigma}^2(k)$ " should read -- $\hat{\sigma}^2_n(k)$ --

Lines 26-27, second equation " $\hat{\sigma}^2(k)$ " should read -- $\hat{\sigma}^2_n(k)$ --

Lines 27-28, second equation change "$\sigma^2(k)$" to -- $\sigma^2_n(k)$ --.
Lines 30-31, third equation, change "$h_n(k+1)$" to -- $h_{(n-1)}(k+1)$ --.

Lines 30-31, third equation change " $\hat{\sigma}^2(k)$ " to -- $\hat{\sigma}^2_n(k)$ --

UNITED STATES PATENT AND TRADEMARK OFFICE
CERTIFICATE OF CORRECTION

PATENT NO.    : 5,912,966
DATED         : June 15, 1999
INVENTOR(S)   : Dominic King-Choi Ho It is certified that error appears in the above-identified patent and that said Letters Patent is hereby corrected as shown below:

<u>Column 12, cont'd.,</u>
Line 41, change "$\sigma_n^2(k)$" to -- $\hat{\sigma}^2_n(k)$ ---

Line 43, change "$\sigma_n^2(k)$" to -- $\hat{\sigma}^2_n(k)$ ---

This certificate supersedes Certificate of Correction issued August 10, 2004.

Signed and Sealed this

Twenty-eighth Day of September, 2004

JON W. DUDAS
*Director of the United States Patent and Trademark Office*